(12) United States Patent
Hattori et al.

(10) Patent No.: US 11,833,630 B2
(45) Date of Patent: Dec. 5, 2023

(54) MACHINE TOOL WITH REMOVABLE WORKPIECE SUPPORT

(71) Applicant: Mazak Corporation, Florence, KY (US)

(72) Inventors: Seiichi Hattori, Florence, KY (US); Masaharu Onji, Florence, KY (US); Shunsuke Koike, Florence, KY (US); Takahiro Fukuda, Union, KY (US)

(73) Assignee: YAMAZAKI MAZAK CORPORATION, Aichi (JP)

( * ) Notice: Subject to any disclaimer, the term of this patent is extended or adjusted under 35 U.S.C. 154(b) by 97 days.

(21) Appl. No.: 17/334,604

(22) Filed: May 28, 2021

(65) Prior Publication Data
US 2022/0379416 A1 Dec. 1, 2022

(51) Int. Cl.
*B23B 9/04* (2006.01)
*B23Q 1/26* (2006.01)
(Continued)

(52) U.S. Cl.
CPC ............... *B23Q 1/26* (2013.01); *B23B 3/065* (2013.01); *B23B 39/10* (2013.01); *B23Q 15/12* (2013.01)

(58) Field of Classification Search
CPC .......... B23Q 3/065; B23Q 1/763; B23Q 1/26; B23Q 16/005; B23Q 17/22; B23B 25/06;
(Continued)

(56) References Cited

U.S. PATENT DOCUMENTS 3,221,352 A 12/1965 Pfister
4,258,598 A 3/1981 Hoffmann
(Continued)

FOREIGN PATENT DOCUMENTS

DE 2245994 A1 4/1973
DE 3442866 A1 5/1986
(Continued)

OTHER PUBLICATIONS

English abstract of DE 102011120765 (Year: 2013).*
(Continued)

*Primary Examiner* — Alan Snyder
(74) *Attorney, Agent, or Firm* — Fitch, Even, Tabin & Flannery LLP

(57) ABSTRACT

In one aspect, a swiss-type machine tool is provided that includes a workpiece holding shaft, a workpiece supporting shaft, and a tool holder associated with the workpiece supporting shaft for holding at least one tool. The machine tool includes a drive operable to rotate the workpiece holding shaft and the workpiece supporting shaft around an axis. The workpiece holding shaft has a work holder configured to secure a workpiece to the workpiece holding shaft. The workpiece holding shaft is axially shiftable relative to the workpiece supporting shaft to adjust a position of the workpiece relative to the workpiece supporting shaft. The machine tool further includes a removable workpiece support, such as a guide bushing, configured to be releasably connected to the workpiece supporting shaft and rotate therewith. The workpiece support slidably contacts the workpiece and permits axial movement of the workpiece relative to the workpiece support.

13 Claims, 12 Drawing Sheets

(51) Int. Cl.
   *B23B 39/10* (2006.01)
   *B23Q 15/12* (2006.01)
   *B23B 3/06* (2006.01)

(58) Field of Classification Search
   CPC ..... B23B 49/00; B23B 2270/48; B23B 3/065; G01B 5/0004
   See application file for complete search history.

(56) References Cited

U.S. PATENT DOCUMENTS

| | | | |
|---|---|---|---|
| 5,170,686 | A | 12/1992 | Schalles |
| 6,637,306 | B2 | 10/2003 | Miyano |
| 7,260,877 | B2 | 8/2007 | Broadley |
| 7,464,628 | B2 | 12/2008 | Shinohara |
| 7,555,973 | B2 | 7/2009 | Asahara |
| 7,886,453 | B2 | 2/2011 | Ould |
| 8,244,396 | B2 | 8/2012 | Terai |
| 8,297,158 | B2 | 10/2012 | Watanabe |
| 9,592,556 | B2 | 3/2017 | Kotake |
| 9,616,500 | B2 | 4/2017 | Yanakawa |
| 10,052,144 | B2 | 8/2018 | Willert |
| 10,293,446 | B2 | 5/2019 | Jacot |
| 10,507,528 | B2 | 12/2019 | Jacot |
| 2007/0199415 | A1 | 8/2007 | Ando |

FOREIGN PATENT DOCUMENTS

| | | | | |
|---|---|---|---|---|
| DE | 102011120765 | A1 * | 6/2013 | ............. B23B 29/14 |
| EP | 1177846 | B1 | 5/2007 | |
| EP | 1829637 | B1 | 7/2015 | |
| JP | S58123414 | A | 7/1983 | |
| JP | H0825183 | A | 1/1996 | |
| JP | H09225703 | A | 9/1997 | |
| JP | H09300177 | A | 11/1997 | |
| JP | 2896530 | B2 | 5/1999 | |
| JP | 2001205503 | A | 7/2001 | |
| JP | 5008498 | B2 | 8/2012 | |
| JP | 2016144843 | A | 8/2016 | |
| JP | 2022552969 | | 12/2022 | |
| WO | 2005065869 | A1 | 7/2005 | |

OTHER PUBLICATIONS

NomuraSwiss, CNC Swiss-Style Turning and Multi-Axis Machining, believed to be publicly available before Aug. 17, 2022, 8 pages.
NomuraSwiss, Swiss Type CNC Auto Lathe Series, believed to be publicly available Apr. 2022, 30 pages.
U.S. Appl. No. 17/941,953, filed Sep. 9, 2022.
U.S. Appl. No. 17/942,107, filed Sep. 9, 2022.
SME, Swiss Machining Made Simpler, ME Staff Report, Jan. 30, 2019, 28 pages.
Greenway, Swiss Type CNC Lathe, believed to be publicly available before Jan. 19, 2021, 5 pages.
Renishaw, RLP40 radio transission lathe probe, 2013, 6 pages.
YouTube Video entitled "CNC Langdrehautomat star* SR-20RIV", https://www.youtube.com/watch?v=DrZjWTUFK6U, published Mar. 19, 2013, Disclosing Screen Captures, 26 pages.
YouTube Video entitled "Star Micronics SR-20R IV Sliding Head Lathe Demonstration", https://www.youtube.com/watch?v=bVoTynHuN8o, published Oct. 1, 2012, Disclosing Screen Captures, 24 pages.
Decision to Grant a Patent, issued in Japanese Application No. 2022-552969, dated May 30, 2023, 5 pages.
International Search Report for International Application No. PCT/JP2022/021784, dated Jul. 19, 2022, 5 pages.
Office Action, issued in Japanese Application No. 2022-552969, dated Feb. 7, 2023, 6 pages.
Office Action, issued in Japanese Application No. 2022-552969, dated Oct. 14, 2022, 6 pages.
Written Opinion for International Application No. PCT/JP2022/021784, dated Jul. 19, 2022, 4 pages.

* cited by examiner

MACHINE TOOL WITH REMOVABLE WORKPIECE SUPPORT

FIELD

This disclosure relates to machines tools and, more specifically, to Swiss-type machine tools.

BACKGROUND

Swiss-type machine tools have a head that rotates a workpiece around an axis and tools that are brought into contact with the rotating workpiece to machine the workpiece. The head of the Swiss-type machine tool includes a shaft that is secured to the workpiece so that the workpiece extends in a cantilevered manner therefrom. A motor of the Swiss-type machine tool rotates the shaft and workpiece secured thereto. The Swiss-type machine tool shifts the shaft from a retracted position to an extended position which causes corresponding axial shifting of the workpiece. The axial shifting of the workpiece allows the machine tool to position a portion of the workpiece for being machined by cutting tools of the Swiss-type machine tool. Typically, the cutting tools of the Swiss-type machine tool are provided in an array of tool holders that is shiftable in X- and Y-axes relative to the workpiece to bring tools supported by the tool holders into contact with the outer diameter of the workpiece to be machined, whereas the Z-axis motion comes from axial movement of the workpiece rather than movement of the array of tool holders.

The head has a guide bushing to support the workpiece as the workpiece rotates and shifts axially. The tool holder array is near the guide bushing along the axis of rotation of the workpiece so that the tools of the tool holder array may machine the workpiece when only a small portion of the workpiece protrudes beyond the guide bushing, and therefore near the support for the workpiece provided by the guide bushing even if the workpiece is relatively long. Thus, Swiss-type machine tools are particularly effective for machining long and slender parts.

Before a Swiss-type machine tool is ready to machine a workpiece, a user sets up the machine tool including programming the positions of tools of the tool holder array relative to the workpiece. In one approach, the user loads the tools into the tool holder array and loads a dummy workpiece into the head of the machine tool. The user utilizes a keyboard to provide information (e.g., diameter and length) regarding the dummy workpiece, initiate rotation of the dummy workpiece, and advance one of the tools into machining contact with the dummy workpiece. The user stops the operation after the tool has cut into the dummy workpiece, measures the depth of the cut in the dummy workpiece, and provides the depth measurement to the machine tool via the keyboard.

The machine tool uses the depth of the cut in the dummy workpiece and the distance the tool traveled to learn positions of the tool relative to the head. The user then repeats the process for the other tools in the tool holder array that will be used to machine a workpiece. The manual setup of the Swiss-type machine tool requires a significant amount of time, considering that some Swiss-type machine tools have tool holder arrays with twenty or more tools. The significant setup time of conventional Swiss-type machine tools adversely affects manufacturing efficiency.

SUMMARY

In accordance with one aspect of the present disclosure, a Swiss-type machine tool is provided that includes a workpiece holding shaft, a workpiece supporting shaft, and a tool holder associated with the workpiece supporting shaft for holding at least one tool. The machine tool includes a drive operable to rotate the workpiece holding shaft and the workpiece supporting shaft around an axis. The workpiece holding shaft has a work holder, such as a collet, configured to secure a workpiece to the workpiece holding shaft. The workpiece holding shaft and the workpiece supporting shaft are axially shiftable relative to one another to adjust a position of the workpiece relative to the workpiece supporting shaft. The machine tool further includes a removable workpiece support, such as a guide bushing, configured to be releasably connected to the workpiece supporting shaft and rotate therewith. The workpiece support slidably contacts the workpiece and permits axial movement of the workpiece relative to the workpiece support. Because the workpiece support is removable from the workpiece supporting shaft, the workpiece support may be removed to permit access to the workpiece holding shaft. Further, the workpiece holding shaft has an axially extended position relative to the workpiece supporting shaft that permits a probe to be connected to the workpiece holding shaft with the workpiece support removed from the workpiece supporting shaft. In this manner, a probe may be used to automate a presetting process of the machine tool despite the close axial proximity of the workpiece supporting shaft and the tool holder which is characteristic of Swiss-type machine tools.

The present disclosure also is directed to a machine tool including a spindle assembly, at least one tool holder associated with the spindle assembly, and a drive operable to rotate the spindle assembly around an axis. The spindle assembly includes an opening and a work holder. The machine tool further includes a probe configured to be connected to the work holder of the spindle assembly and sized to fit in the opening of the spindle assembly. The work holder has an extended position wherein the work holder is positioned to receive the probe and a retracted position wherein at least a portion of the probe is in the opening of the spindle assembly. The work holder, in the extended position, facilitates connecting of the probe to the work holder. Once the probe has been connected to the work holder, the work holder retracts wherein at least a portion of the probe is in the spindle assembly. By receiving the at least a portion of the probe in the opening spindle assembly, the axial distance the probe protrudes forward of the spindle assembly can be minimized and permits a sensing portion of the probe to be radially aligned with the tool holder which may be adjacent the spindle assembly along the axis.

In another aspect, a machine tool is disclosed that includes a workpiece holding shaft, a workpiece supporting shaft, and a work holder of the workpiece holding shaft. The machine tool includes at least one drive operable to rotate the workpiece holding shaft and the workpiece supporting shaft around an axis. The drive is further operable to axially shift the workpiece holding shaft and the workpiece supporting shaft relative to one another. The machine tool includes a tool holder associated with the workpiece supporting shaft and a tool holder actuator operable to move the tool holder. The machine tool has a user interface to receive a setup command, such as when a user wants to setup the machine tool to use a specific tool to machine a workpiece. The machine tool further includes a controller, upon receiving the setup command via the user interface, configured to cause the drive to shift the workpiece holding shaft to an extended position to permit connecting of the probe to the workpiece holding shaft. The controller is further configured to cause the tool holder actuator to move the tool holder to bring the tool into contact with the probe. The controller then determines tool setup data based upon a signal from the probe and the movement of the tool holder. In this manner, the machine tool autonomously learns the relative positions of the tool holder and the probe by moving the tool into contact with the probe so that the machine tool may be setup to machine a workpiece once the probe has been removed and replaced with the workpiece. The machine tool facilitates rapid presetting of the machine tool to utilize a large number of tools, such as twenty or more tools.

The present disclosure also is directed to a method of operating a machine tool having a workpiece holding shaft and a workpiece supporting shaft that are rotatable about an axis during a machining operation. The method includes axially shifting the workpiece holding shaft and the workpiece supporting shaft relative to one another to position the workpiece holding shaft at an axially extended position relative to the workpiece supporting shaft. The workpiece holding shaft includes a workpiece holder that is positioned to receive a probe with the workpiece holding shaft at the extended position. The method includes axially shifting the workpiece holding shaft and the workpiece supporting shaft relative to one another with the probe connected to the workpiece holder to position the workpiece holding shaft at an axially retracted position relative to the workpiece supporting shaft. A tool holder of the machine tool is moved to bring a tool supported in the tool holder into contact with the sensing portion of the probe. Further, the method includes determining setup data for the tool based at least in part upon a signal from the probe and the moving of the tool holder. Because the probe is connected to the workpiece holder, the probe moves with the workpiece holding shaft to the retracted position. The retracting of the probe permits a sensing portion of the probe to be positioned only a short axial distance beyond the workpiece holding shaft even when the overall axial length of the probe is two or more times greater than the short axial distance.

In another aspect, the present disclosure includes a computer readable medium having instructions stored therein that, when executed by a processor of the machine tool, cause the machine tool to perform operations including axially shifting a workpiece holding shaft and a workpiece supporting shaft of the machine tool relative to one another to position the workpiece holding shaft at an extended position relative to the workpiece supporting shaft. The workpiece holding shaft includes a workpiece holder that is positioned to receive a probe with the workpiece holding shaft at the extended position. The operations further include axially shifting the workpiece holding shaft and the workpiece supporting shaft relative to one another with the probe connected to the workpiece holder to position the workpiece holding shaft at a retracted position relative to the workpiece supporting shaft. A tool holder of the machine tool is moved to bring a tool of the tool holder into contact with the probe. Further, the operations include determining setup data for the tool based at least in part upon a signal from the probe and the moving of the tool holder. The axial shifting of the workpiece holding shaft relative to the workpiece supporting shaft to the retracted position moves the probe from the forward extended position rearward relative to the tool holder and permits aligning of a sensing portion of the probe with the tool holder. The machine tool may utilize a macro to autonomously move the tool into contact with the sensing portion of the probe and store the movement parameters used to bring the tool into contact with the sensing portion of the probe. The autonomous tool learning process avoids the time-intensive, conventional approach for setting up Swiss-type machine tools using dummy workpieces as discussed above.

The present disclosure also provides a machine tool having a workpiece holding shaft, a workpiece supporting shaft, and a tool holder associated with the workpiece supporting shaft for holding at least one tool. The machine tool has a drive to rotate one of the workpiece holding shaft and the workpiece supporting shaft around an axis. The machine tool further includes a ball spline connection of the workpiece holding shaft and the workpiece supporting shaft configured to transfer the rotation of the one of the workpiece holding shaft and the workpiece supporting shaft to rotation of the other of the workpiece holding shaft and the workpiece supporting shaft. The ball spline connection permits axial shifting of the workpiece holding shaft and the workpiece supporting shaft relative to one another to axially adjust a position of the workpiece relative to the workpiece supporting shaft while providing accurate rotary positioning of the workpiece.

DETAILED DESCRIPTION

Figure 1:
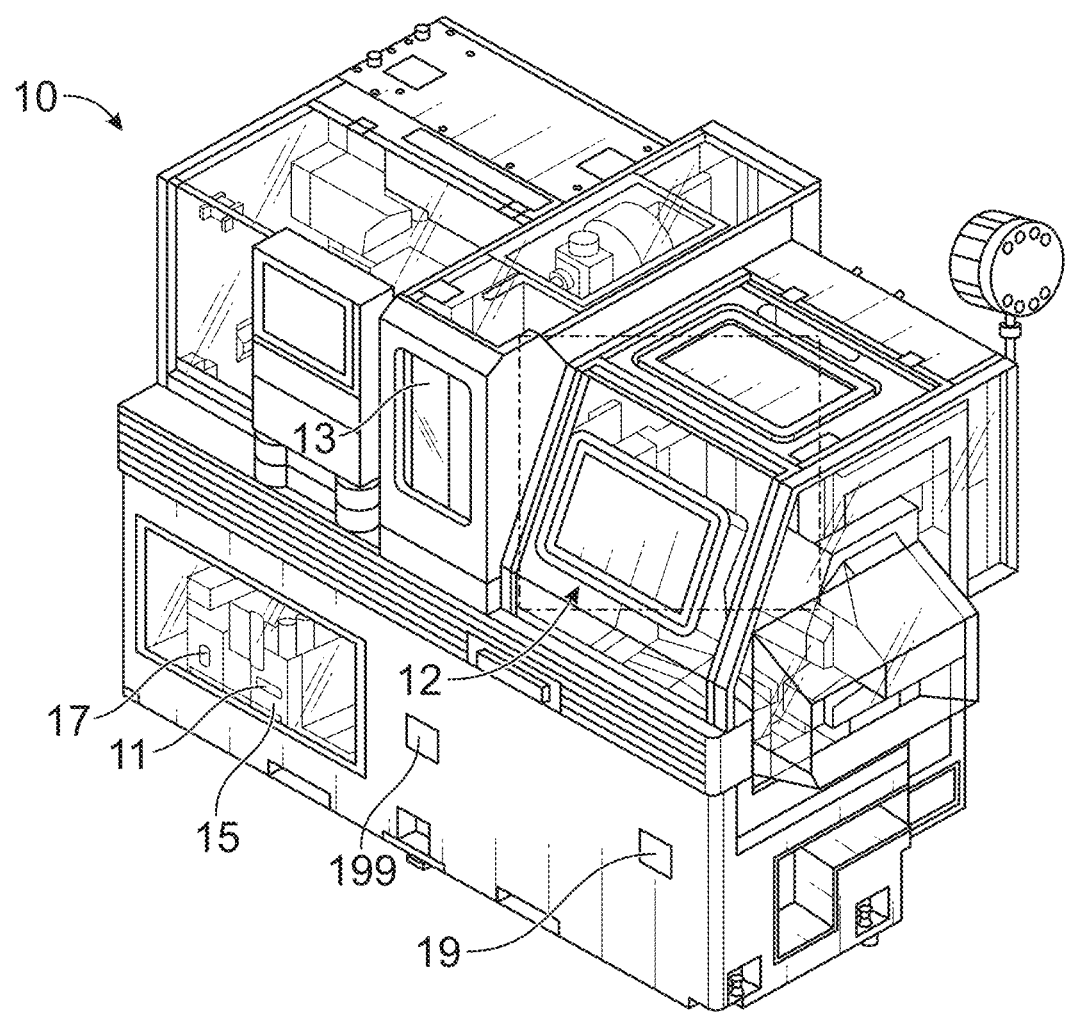
FIG. 1 is a perspective view of a high-speed Swiss-type machine tool.

In FIG. 1, a machine tool, such as a high-speed swiss-type machine tool 10, is illustrated having a machining area 12. The machine tool 10 has a controller 11 operably coupled to various motors and components of the machine tool 10 to facilitate operation of the machine tool 10. The machine tool 10 has a user interface 13, such as screen, a keyboard, microphone, and/or a speaker to receive user inputs and provide information to the user. The controller 11 includes a memory 15 to store instructions for operating the machine, such as one or more macros, and a processor 17 to implement the instructions. The machine tool 10 permits rapid presetting or setup of the tooling of the machine and, in some embodiments, automated setup of the machine tooling. The machine tool 10 has a first head 14 including a removable workpiece support, such as a guide bushing 70 (see FIG. 7), that is removable from a spindle shaft 102 (see FIG. 6) of the first head 14 to permit a probe 30 to be connected to a spline shaft 104 of the first head 14. The machine tool 10 utilizes the probe 30 to detect when a tool associated with the first head 14 contacts the probe 30 as part of identifying the positions of workpiece engaging portions of the tools relative to an axis of rotation of the first head 14.

More specifically, the machine tool 10 such as via the controller 11 thereof receives tool data regarding tools associated with the first head 14 via the user interface 13 or communication circuitry 19 of the machine tool 10 and its controller 11. The communication circuitry 19 may include, for example, one or more of a network connection to connect to a local wired or wireless network, a short-range wireless interface such as a RFID reader to read RFID tags of the tools, a wired interface to receive data from a memory of each tool, and/or an optical reader to detect information from a machine-readable indicium such as a barcode of the tool. The controller 11 is operable to cause one or more tool holder actuators 18A to advance a tool holder 18B associated with the first head 14 from an initial position until a tool 18C of the tool holder 18B contacts the probe 30 which is located at or near a machining position of a workpiece mounted to the first head 14. The controller 11 learns the tool setup data associated with moving the tool 18A from the initial position into contact with the probe 30 and subsequently returns the tool to its initial position. The machine tool 10 repeats the advancing and learning process for one or more other tools associated with the first head 14 that are to be utilized for a given machining operation. Once the controller 11 has determined the tool setup data, the guide bushing 70 is reinstalled on the spline shaft 104. The machine tool 10 receives data regarding the workpiece, such as material and diameter, as well as process instructions for machining a workpiece. The controller 11 uses the tool setup data to implement the process instructions and machine the workpiece.

Figure 2:
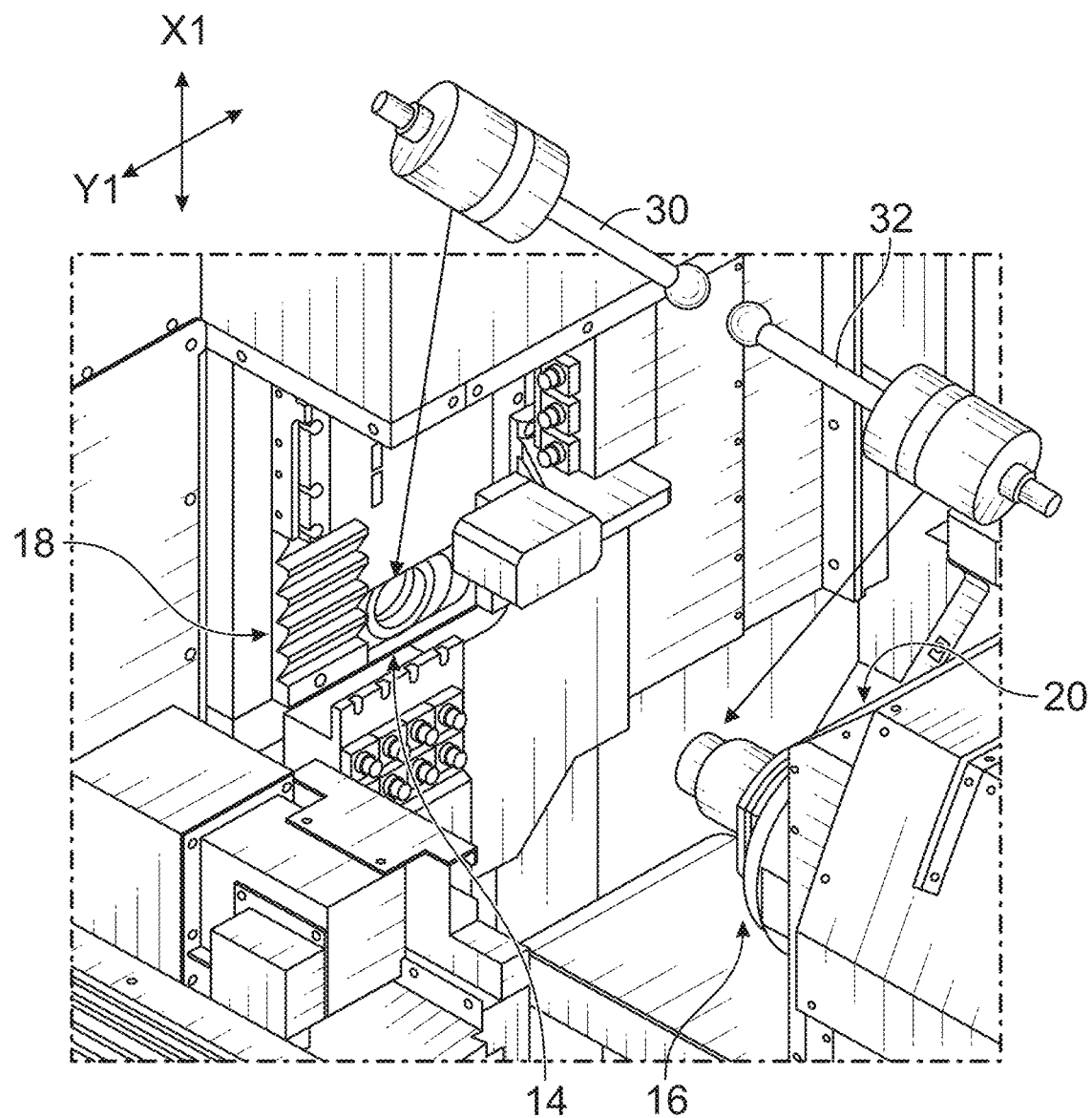
FIG. 2 is a view of an interior of a machining area of the Swiss-type machine tool of FIG. 1 shown generally with the dashed box in FIG. 1, the machining area having first and second headstocks that receive a workpiece and rotate the workpiece relative to a first tool holder array and a second tool holder array.
Figure 3:
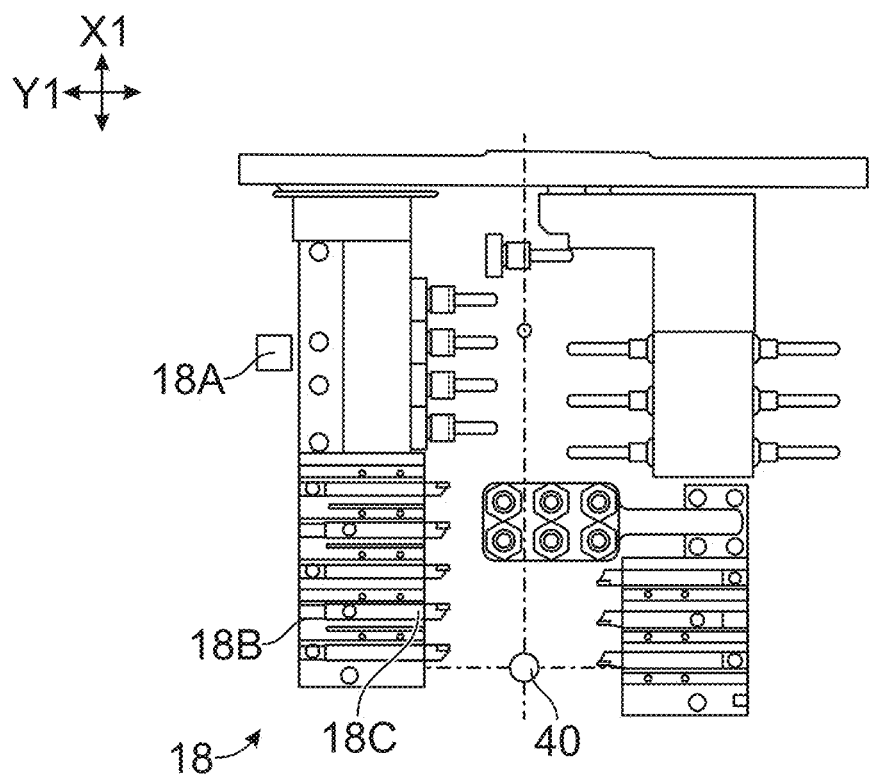
FIG. 3 is an elevational view of the first tool holder array of the machine tool of FIG. 1 showing tools of the first tool holder array for machining the workpiece supported by the first headstock.
Figure 4:
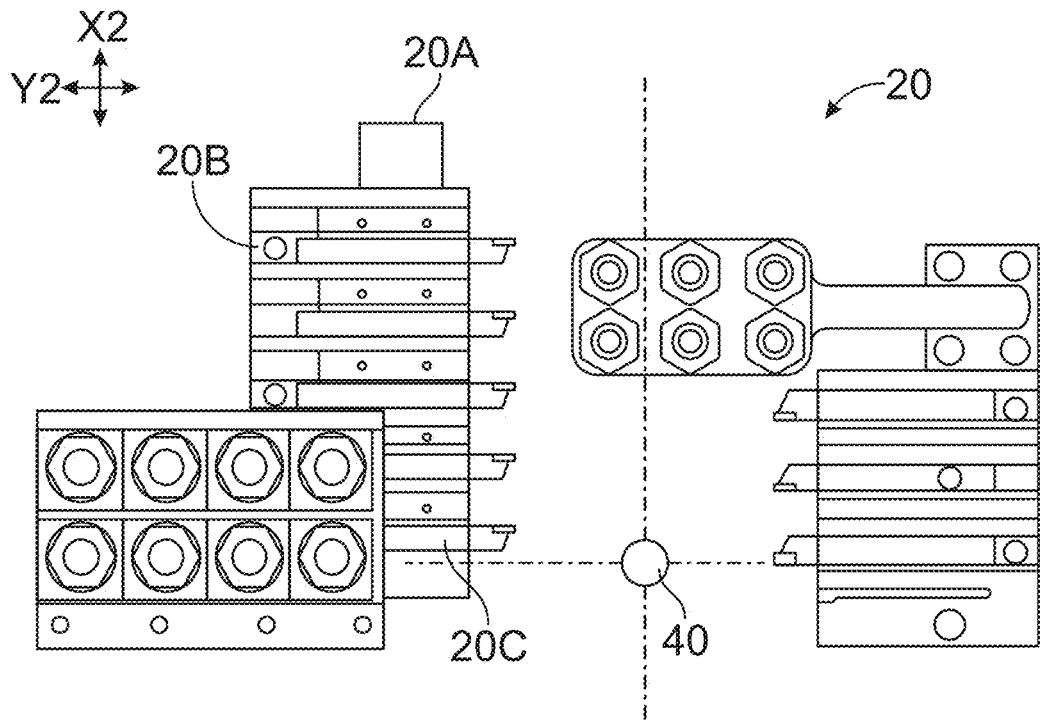
FIG. 4 is an elevational view of the second tool holder array of the machine tool of FIG. 1 showing tools of the second tool holder array for machining the workpiece supported by the second headstock.

With reference to FIG. 2, an interior of the machining area 12 is shown. The machine tool 10 includes a first head 14 and a second head 16. The first head 14 receives an elongate workpiece, typically a rod, and rotates the workpiece so that the workpiece may be machined by tools of a first tool holder array 18 (see also FIG. 3). The second head 16 may support an end of the workpiece held by the first head 14 or may be used independently of the first head 14. The workpiece received in the second head 16 may be machined by tools of a second tool holder array 20 (see FIG. 4). Elevational views of the first and second tool holder arrays 18, 20 are provided in FIGS. 3 and 4.

With reference to FIG. 2, the machine tool 10 has a probe 32 for setting up the machine tool 10 to utilize tools of the tool holder array 20 to machine a workpiece in the second head 16. Like the presetting process for the first head 14, the controller 11 causes one or more tool holder actuator 20A to move tool holders 20B and bring tools 20C into contact with the ball 40 of the probe 30. The processor determines setup data based on the movement of the tool holders 20B and signals from the probe 32 once the tools contact the ball 40.

Figure 5A:
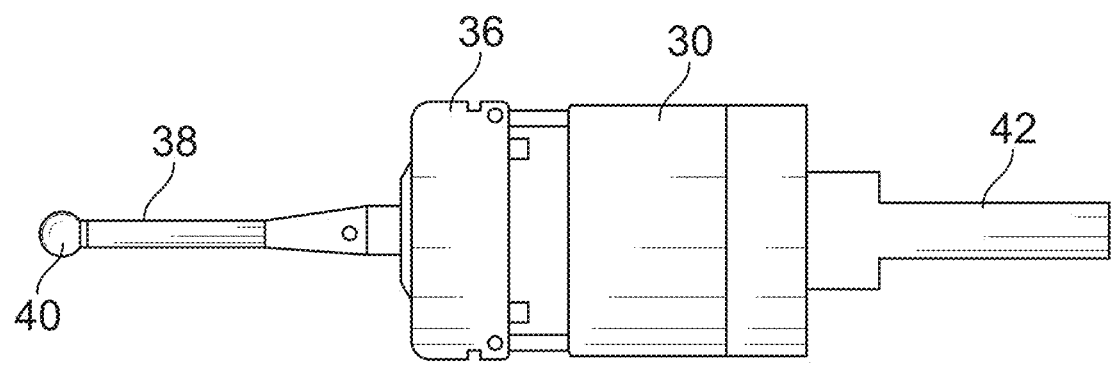
FIG. 5A is a side elevational view of a probe having an adapter portion to be connected to a collet of the first headstock, the probe having a stylus with a ball tip for contacting tools of the first tool holder array during a tool presetting operation.
Figure 5B:
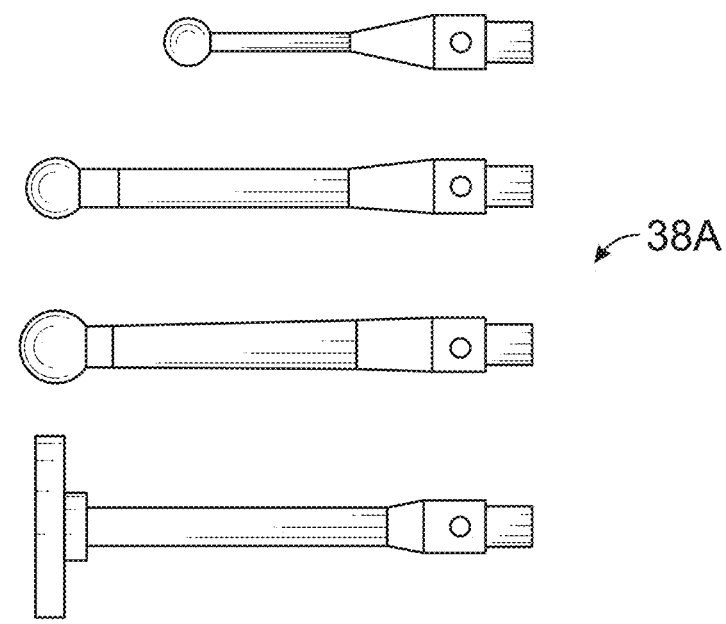
FIG. 5B is a side elevational view of different configurations of styluses that may be used with the probe of FIG. 5A.

Referring to FIG. 5A, the probes 30, 32 are similar and each include a body 36 containing sensing and communication circuitry, an elongate stylus 38 having a sensor sphere 40 at a distal end thereof, and an adapter portion 42 configured to be secured by a collet of the first or second head 14, 16. The body 36 and stylus 38 may be releasably connected. Referring to FIG. 5B, different styluses 38A are provided that may be used depending on a particular application. The probes 30, 32 may be off-the-shelf products such as a Renishaw RLP 40.

During setup of the machine tool 10, the probes 30, 32 are connected to the first and second heads 14, 16. The tool holder actuators 18A, 20A are operable to shift the first and second tool holder arrays 18, 20 in respective planes in the X1, Y1 and X2, Y2 directions. In some embodiments, the actuators 18A, 20A pivot one or more tool holders to position tools of the tool holder to contact the workpiece. The machine tool controller 11 is programmed to automatically move the first and second tool holder arrays 18, 20 and bring each tool thereof into contact with the sphere 40 of the associated probe 30, 32. Once the tool contacts the sphere 40, the probe 30, 32 sends a wireless communication to communication circuitry 19 indicating contact. In one embodiment, the wireless communication is performed using a Bluetooth® protocol.

The controller 11 determines the change in position used to bring the tool into contact with the sphere 40, which the controller then uses to determine the change in position needed to bring the tool into contact with a workpiece once the workpiece is loaded into the first or second heads 14, 16 (completing setup involves the user entering information regarding the workpiece, such as the material of the workpiece, length of the workpiece, and the outer diameter of the rod). The controller 11 utilizes parameters of the probes 30, 32, such as the outer diameter of the sphere 40, to determine how far in the X- and Y-directions the controller 11 had to move the tool to contact the sphere having a particular diameter. The controller 11 may then determine how far to move the tool in the X- and Y-directions to contact a workpiece having a given outer diameter that is larger or smaller than the diameter of the sphere 40. The parameters of the probes 30, 32 including the sensor sphere diameter may be provided to the controller 11 such as by a user entering the manufacturer and model number of the probes 30, 32 and/or the probes 30, 32 wirelessly communicating their parameters to the controller 11.

Figure 6:
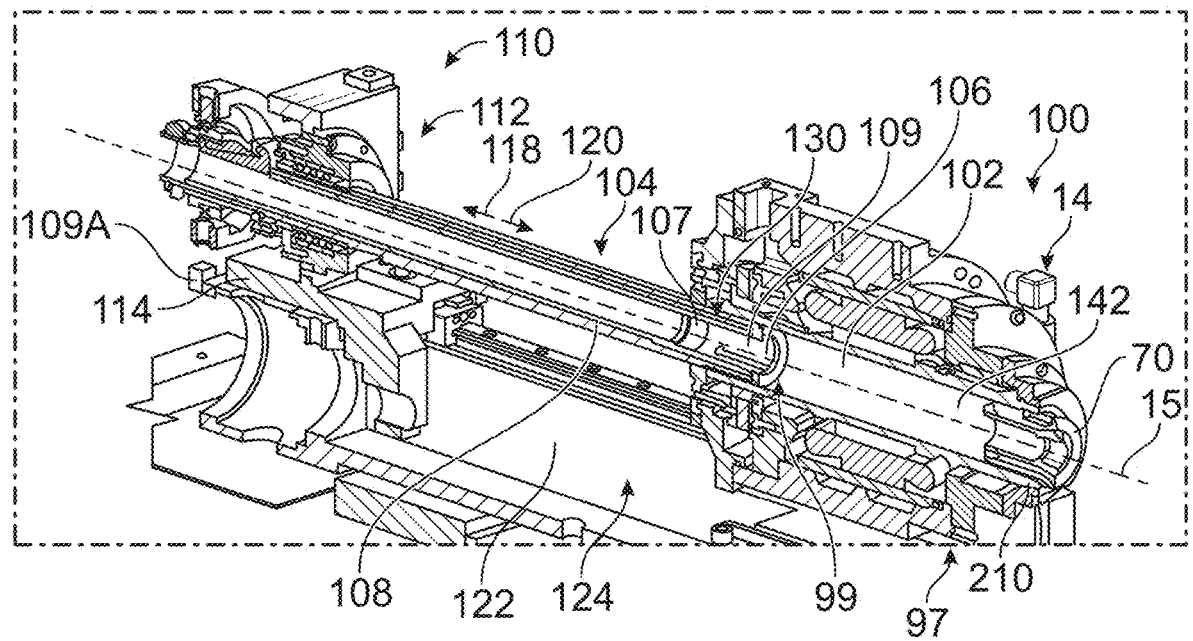
FIG. 6 is a cross-sectional view of the first headstock of the machine tool of FIG. 1 showing a spindle assembly including a spindle shaft of the first headstock, a removable guide bushing connected to the spindle shaft, a spline shaft of the spindle assembly axially shiftable relative to the spindle shaft and rotatable therewith, and a workpiece-holding collet of the spline shaft.

More specifically and with reference to FIG. 6, the first head 14 includes at least one drive to rotate and axially shift the workpiece. In one embodiment, the at least one drive includes a first drive 97 having a motor 100. The first head 14 further includes a spindle assembly 99 including a workpiece supporting shaft in the form of a spindle shaft 102 and a workpiece holding shaft in the form of a spline shaft 104, and a collet assembly 106 of the spline shaft 104. The collet assembly 106 includes an adapter, such as a collet adapter 107, to engage a radially inner surface of the spline shaft 104 and a workpiece holder, such as a collet 109, to engage the workpiece. The spline shaft 104 has an interior sleeve 108 that receives a workpiece. The motor 100 may rotate the spindle shaft 102 and spline shaft 104 at high speeds, such as 10,000 RPMs or faster.

The machine tool 10 includes a rotary position sensor 199 (see FIG. 1) configured to detect a position of the spindle assembly 99, such as one or both of the spindle shaft 102 and the spline shaft 104. The rotary position sensor 199 may be a component of the motor 100 or a separate component as some examples. The controller 11 utilizes data from the rotary position sensor 199 to determine the rotary position of the workpiece and operate the motor 100 to adjust the rotary position of the workpiece. Thus, the machine tool 10 operates the motor 100 to both rotate the workpiece at a high-speed relative the tools of the first toolholder array 18 during a lathe-style procedure and provide high-accuracy rotary positioning of the workpiece relative to the tools of the first toolholder array 18.

In one embodiment, the rotary position sensor 199 includes an encoder such as an absolute and/or incremental encoder. The encoder may include an angle encoder and/or a rotary encoder as some examples. The rotary position sensor 199 may include one or more sensors. For example, the rotary position sensor 199 may include an encoder and a laser measurement device. The laser measurement device includes an indexer of the spindle shaft 99, a laser source, and a laser detector. The laser source directs a laser at the indexer, the laser reflects from the indexer, and the reflected laser is received at the laser detector.

In one embodiment, the controller 11 is configured to utilize data from the laser source and laser detector to determine an input correction value. The controller 11 determines the position of the spindle assembly 99 and workpiece secured therein based at least in part on data from the encoder and the input correction value. The input correction value may be continuously or periodically calculated, such as at every machine setup operation, tool change, or change in direction of the rotation of the spindle assembly 99 as some examples.

The first head 14 includes a support assembly 110 having bearing assemblies 112 that permit rotation of the spline shaft 104. The support assembly 110 further includes a support, such as a carriage 114. The machine tool 10 includes a second drive 109 operable to axially shift the carriage 114 in directions 118, 120 along a rail 122 of a frame 124 of the machine tool 10. The second drive 109 may include a motor 109A and a ball-and-screw transmission, as one example. Although the spline shaft 104 is rotatable relative to the support assembly 110 so as to be rotatably mounted thereto, the spline shaft 104 is mounted to the support assembly 110 so that shifting of the support assembly 110 in directions 118, 120 along the axis of rotation 15 causes axial shifting of the spline shaft 104. Thus, movement of the support assembly in directions 118, 120 produces corresponding movement of the spline shaft 104, collet 109, and workpiece held therein in directions 118, 120.

The spindle shaft 102 and spline shaft 104 have a slide connection 130 therebetween that permits the spine shaft 104 to shift axially in directions 118, 120 relative to the spindle shaft 102. However, the slide connection 130 includes axially extending splines of the spindle shaft 102 and spline shaft 104 that are engaged to be axially slidable relative to each other but fix the spindle shaft 102 and spline shaft 104 rotationally relative to one another. In this manner, rotation of the spindle shaft 102 causes rotation of the spline shaft 104. Thus, the spline shaft 104 may be shifted axially in directions 118, 120 via movement of the support assembly 110 as the spindle shaft 102 and spline shaft 104 rotate together.

Figure 7:
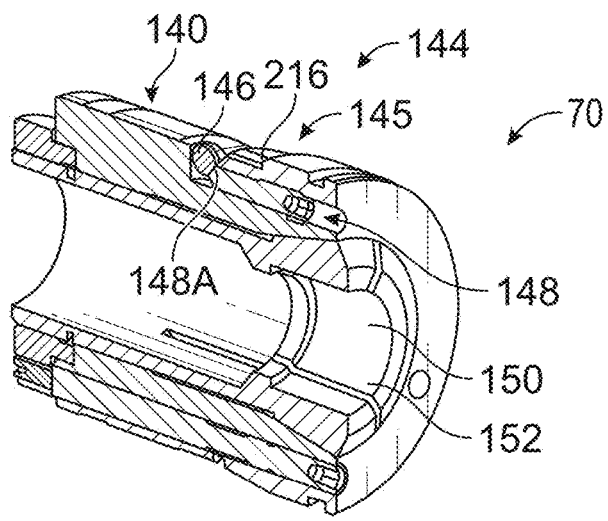
FIG. 7 is an enlarged, cross-sectional view of the removable guide bushing of FIG. 6 showing a detent mechanism for selectively securing the guide bushing to the spindle shaft.

As can be seen in FIGS. 6 and 7, the guide bushing 70 includes a body 140 sized to fit in an opening 142 of the spindle shaft 102. The guide bushing 70 has a radially outer lock 144 to releasably secure the guide bushing 70 in the spindle shaft 102. The lock 144 includes a detent mechanism 145 including one or more detent members, such as a ball 146. The lock 144 has a locked configuration wherein the ball 146 is urged radially outward to secure the guide bushing 70 in the spindle shaft 102 and an unlocked configuration wherein the ball 146 may shift radially inward and permit the guide bushing 70 to be withdrawn and removed from the spindle shaft 102. When the ball 146 is in the radially outer locked position, the ball 146 engages a radially inwardly facing annular groove 204 (see FIG. 9) of the spindle shaft 102 and fixes the guide bushing 70 to the spindle shaft 102 against relative axial movement therebetween. The detent mechanism 145 includes a set screw 148 that is tightened to lock the ball 146 in the radially outer locked position. In one embodiment, the set screw 148 has a distal end with a tapered cam surface 148A so that as the set screw 148 is advanced, the cam surface 148A engages an outer surface of the ball 146 urging it radially outward and clamps the ball 146 between the tapered surface 148A of the set screw 148 and the spindle shaft 102 in the groove 204 thereof. The set screw 148 may be loosened to retract and permit the ball 146 to shift radially inward to the unlocked position and permit the guide bushing 70 to be removed from the spindle shaft 102.

The guide bushing 70 further includes a guide collet 150 with an opening 152 that receives the workpiece. Whereas the collet 109 of the spline shaft 104 is fixed to the workpiece against relative axial and rotational movement, the guide collet 150 of the guide bushing 70 permits the workpiece to shift axially within the opening 152 via axial shifting of the spline shaft 104 so that the desired length of the workpiece may be shifted beyond the guide bushing 70 to be exposed to the tools of the tool holder array 18.

Prior to machining a workpiece using the machine tool 10, a user sets up the machine tool 10 to machine the workpiece. Initially, the user removes the guide bushing 70 from the spindle shaft 102. Next, the user interacts with the user interface 13 of the machine tool 10 and causes the machine tool 10 to advance the support assembly 110 to jog forward in direction 120 until the collet 109 in the spline shaft 104 is adjacent a forward end 210 of the spindle shaft 102. The user then loads the adapter 42 of the probe 30 into the collect 109. The user also connects the probe 32 to the second head 16.

Once the adapter 42 has been secured to the spline shaft 104 via the collect 109, the user initiates a setup process and the controller 11 of the machine tool 10 retracts the support assembly 110 and spline shaft 104 in direction 118 until the sphere 40 of the probe 30 is at an axial position along the axis of rotation 15 wherein the sphere 40 is radially aligned with the tools of the first tool holder array 18. The controller 11 of the machine tool 10 then automatically shifts the first tool holder array 18 in the X and Y directions to bring each tool into contact with the sphere 40. The controller monitors the change in position of the first tool holder array 18 as the first tool holder array 18 travels to bring each tool into contact with the sphere 40 to determine the distance between each tool and the probe 30, and specifically the outer surface of the sensor sphere 40. The controller performs a similar process to determine the relative positions of the tools of the second tool holder array 20 and the sphere 40 of the probe 32. The automated process of the controller determining the relative positions of each tool of the first and second tool holder arrays 18, 20 and the probes 30, 32 saves a user a significant amount of time, as has previously been discussed.

The body 36 of the probe 30 has a diameter that is larger than the diameter of the opening 152 of the guide bushing 70 (which has a size similar to a conventional guide bushing opening) such that the probe 30 cannot be fit through the guide bushing opening 152 and travel into the opening 142 of the spindle shaft 102. However, by removing the guide bushing 70, the body 36 of the probe 30 may be retracted into the opening 142 of the spindle shaft 102 until the sphere 40 of the probe 30 is radially aligned with the first tool holder array 18. Thus, the removable guide bushing 70 permits the probe 30 to be used with the first head 14 and facilitates automated presetting of the machine tool 10.

Figure 8:
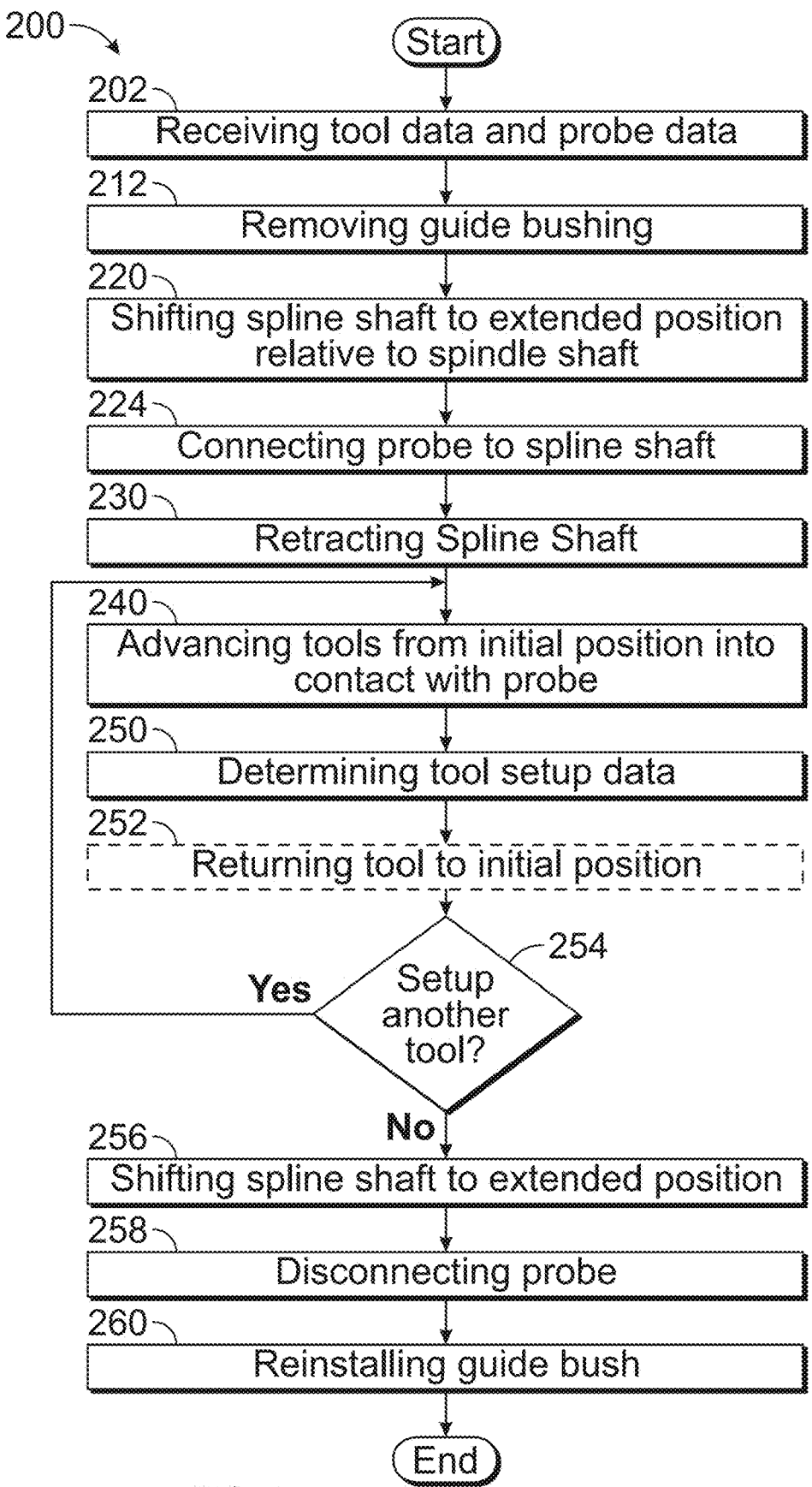
FIG. 8 is a flow diagram of a presetting operation of the machine tool of FIG. 1.

Referring to FIG. 8, a method 200 of presetting the machine tool 10 is provided and discussed with respect to FIGS. 9-13. The method 200 includes receiving 202 tool data and probe data. The step of receiving 202 the data may include a user inputting data regarding one or more tools and the probe 30 to the controller 11 of the machine tool 10 using the user interface 13. The tool data may include, for example, information identifying the type, size, intended material, and manufacturer of the tool. The probe data may include, for example, information relating to the manufacturer, model number, stylus, and/or wireless communication protocol of the probe 30. In some embodiments, the machine tool 10 or controller 11 thereof receives the tool data and the probe data via wired or wireless communication approaches, such as by receiving tool data from RFID tags of the tools and receiving the probe data upon pairing with the probe 30 such by using a Bluetooth® connection.

Figure 9:
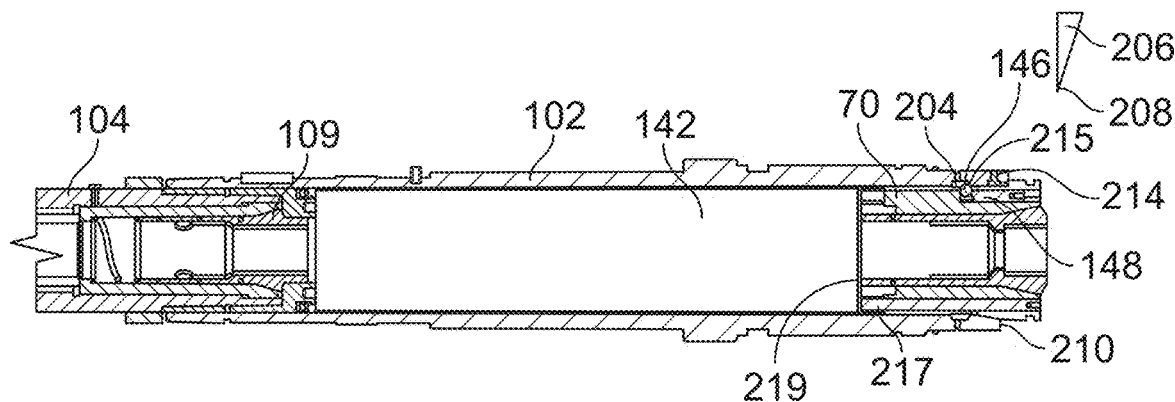
FIG. 9 is a cross-sectional view of a portion of the spindle assembly showing the spline shaft in a retracted position and the guide bushing secured to the spindle shaft.

Regarding FIG. 9, the guide bushing 70 is shown secured to the spindle shaft 102 with the detent mechanism 145 of the guide bushing 70 in the locked configuration such that the ball 146 is urged radially outward to project radially outward partially beyond the guide bushing 70 and to be partially received in the groove 204 of the spindle shaft 102. The upper half of the ball 146 overlaps a radially extending stop surface 215 of the groove 204 in a radial direction. With the guide bushing 70 inserted in the spindle shaft opening 142 so that an axially inner end portion 217 of the guide bushing 70 seats against a seating surface 219 of the spindle shaft 102, and the lock 144 shifted to its locked configuration with the ball 146 engaging the stop surface 215 of the groove 204, the guide bushing 70 is fixed against axial movement relative to the spindle shaft 102. Further, a tool 206 of the first tool holder array 18 is positioned with a workpiece engaging or cutting portion 208 thereof in proximity to a forward end 210 of the spindle shaft 102.

Figure 10:
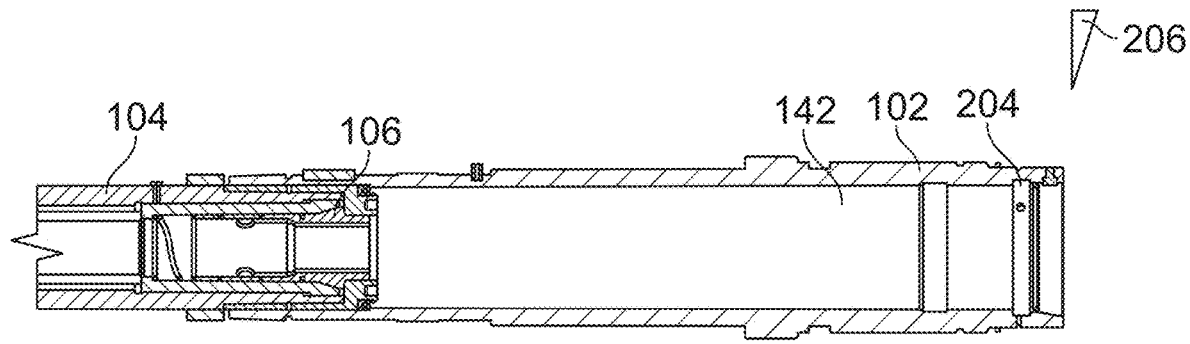
FIG. 10 is a view similar to FIG. 9 showing the guide bushing removed from the spindle shaft to permit access to the interior of the spindle shaft.

The method 200 includes removing 212 the guide bushing 70. For example, the step of removing 212 the guide bushing 70 includes a user loosening the set screw 148 to retract it away from the ball permitting the ball 146 to shift radially inward and out from the groove 204. The spindle shaft 102 can include a key 214 that engages an axial keyway 216 (see FIG. 7) of the guide bushing 70 to further inhibit relative rotation between the guide bushing 70 and the spindle shaft 102. Thus, the step of removing 212 the guide bushing 70 may also include disengaging the key 214 from the keyway 216. With reference to FIG. 10, the spindle shaft 102 and spline shaft 104 are shown with the guide bushing 70 removed.

Figure 11:
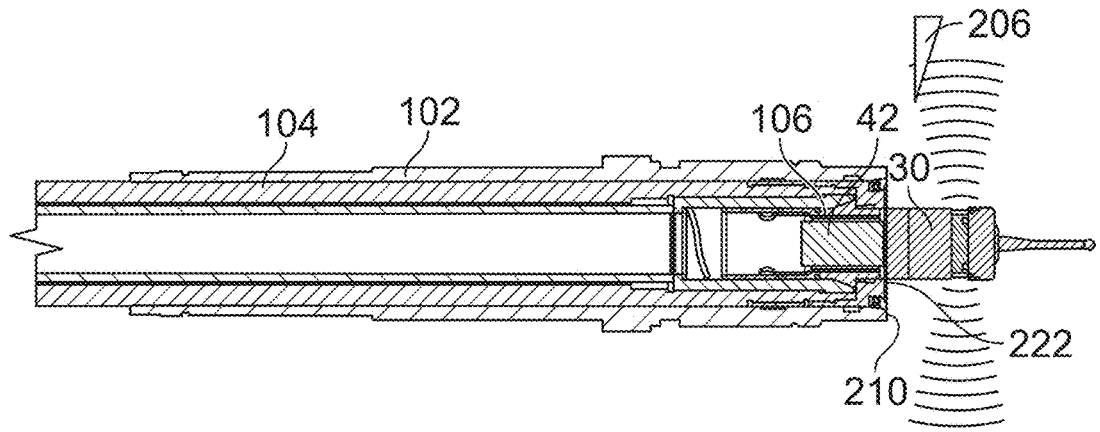
FIG. 11 is a view similar to FIG. 10 showing the spline shaft in an extended position and the probe of FIG. 5A connected to the spline shaft.

The method 200 includes shifting 220 the spline shaft 104 to an extended position relative to the spindle shaft 102 as shown in FIG. 11. In the extended position, the spline shaft 104 has a forward end 222 that is level with, or slightly axially outward or inward of the forward end 210 of the spindle shaft 102.

The method 200 includes connecting 224 the probe 30 to the spline shaft 104. The step of connecting 224 the probe 30 may include securing the rear adapter portion 42 of the probe 30 in the collet 109 of the spline shaft 104. FIG. 11 shows the spline shaft 104 after the adapter portion 42 is secured in the collet 109.

Figure 12:
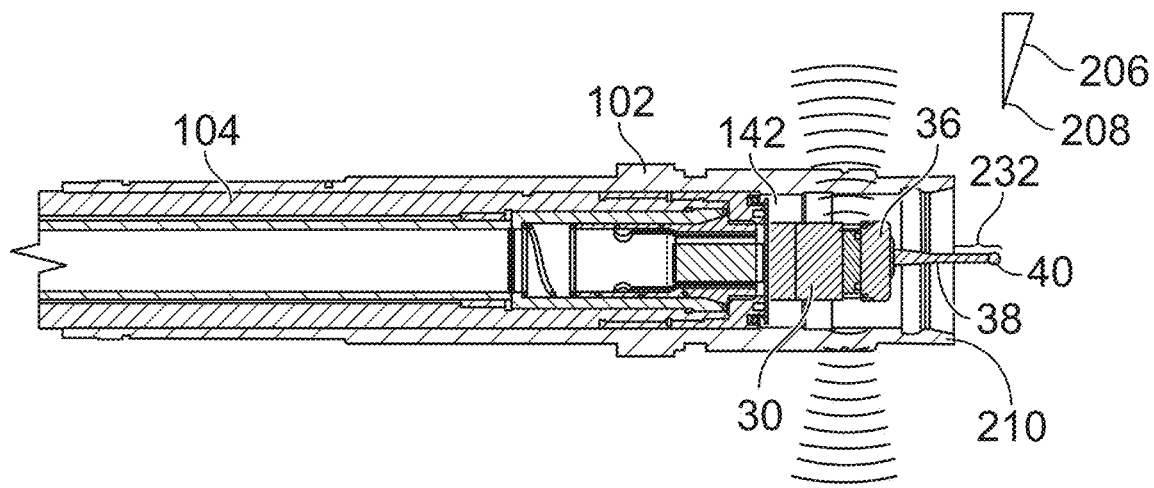
FIG. 12 is a view similar to FIG. 11 showing the spline shaft in an intermediate retracted position, the probe retracted into the interior of the spindle shaft, and the ball tip of the projecting stylus radially aligned with a cutting tool of the first tool holder array.
Figure 13:
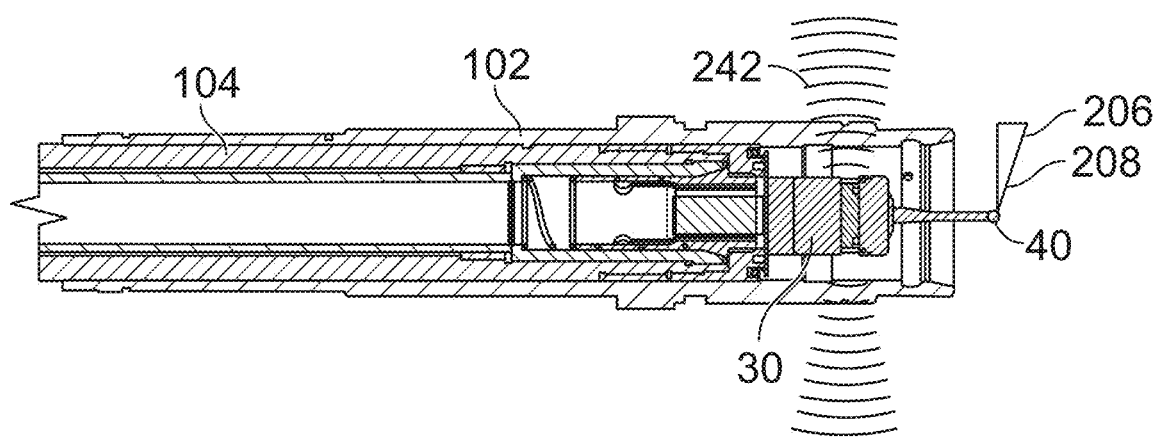
FIG. 13 is a view similar to FIG. 12 showing the cutting tool shifted radially downward to contact the ball tip of the probe.

The method 200 includes retracting 230 the spline shaft 104 from the extended position such as to an intermediate position as shown in FIG. 12. In the intermediate position, the spline shaft 104 is positioned so that the probe 30 mounted thereto is drawn partially into the opening 142 of the spindle shaft 102. As shown in FIG. 12, the entire body 36 of the probe 30 is received in the opening 142 of the spindle shaft 102 and a forward portion 232 of the stylus 38 including the sensor ball 40 protrudes forward of the forward end 210 of the spindle shaft 102. With the spline shaft 104 in the intermediate position, the ball 40 of the probe 30 is radially aligned with the workpiece engaging or cutting portion 208 of the tool 206.

The method 200 includes advancing 240 the tool 206 from an initial position into contact with the ball 40 of the probe 30. The user may participate in operation 240 such as by directing the movement of the first tool holder array 18 to bring the tool 206 into contact with the probe 30 using the user interface. In one embodiment, the tool holder supporting the tool 206 is constrained to move in the X- and Y-axes (see FIG. 2) with the tool holder array 18, such that the tool 206 is brought into contact with the probe 30 by shifting of the tool holder array 18 in X- and/or Y-directions. Upon the tool 206 contacting the probe 30, the probe 30 sends a wireless communication 242 (see FIG. 11) that is received by the communication circuitry 19. The communication indicates that the probe 30 detected the tool 206 contacting the ball 40.

The method 200 includes determining 250 tool setup data. The step of determining 250 tool setup data utilizes the change in the X-, Y-, and/or Z-coordinates that the tool holder 18B underwent as the machine tool 10 advanced the tool 206 into contact with the probe.

The method 200 optionally includes returning 252 the tool 206 to the initial position. The step of returning 252 the tool 206 removes the tool 206 out of the way so that another tool of the first tool holder array 18 may be brought into contact with the probe 30.

The method 200 includes determining 254 whether to set up another tool. If so, the method 200 performs the advancing 240, determining 250, and returning 252 operations with the next tool of the first tool holder array 18.

Once the tools of the tool holder array 18 that are going to be utilized to machine a workpiece have been set up, the method 200 includes shifting 256 the spline shaft 104 to an extended position relative to the spindle shaft 102 such as the position shown in FIG. 11. The shifting 256 of the spline shaft 104 to the extended position positions the probe 30 to be disconnected from the spline shaft 104, such as by shifting the spline shaft 104 until the body 36 of the probe 30 is beyond of the forward end 210 of the spindle shaft 102.

The method 200 further includes disconnecting 258 the probe 30 from the spline shaft 104 and reinstalling 260 the guide bushing 70 in the spindle shaft 102. Once the method 200 is completed, the machine tool 10 is ready to machine a workpiece upon receiving machining instructions.

One or more steps or operations of the method 200 may be performed by the controller 11 of the machine tool 10 to automate presetting of the machine tool 10. In one embodiment, the controller 11 performs the operations of the method 200 and requests user participation at operations 212, 224, 258, and 260 which involve removing and installing the guide bushing 70 and connecting and disconnecting the probe 30. The remaining operations may be performed in an automated or autonomous manner without user intervention which improves the rapidity of presetting the machine tool 10. In some embodiments, the controller 11 may also perform operations 212, 224, 258, 260 such as by coordinating the operation of a robotic arm to remove/install the guide bushing 70 and connect/disconnect the probe 30.

Figure 14:
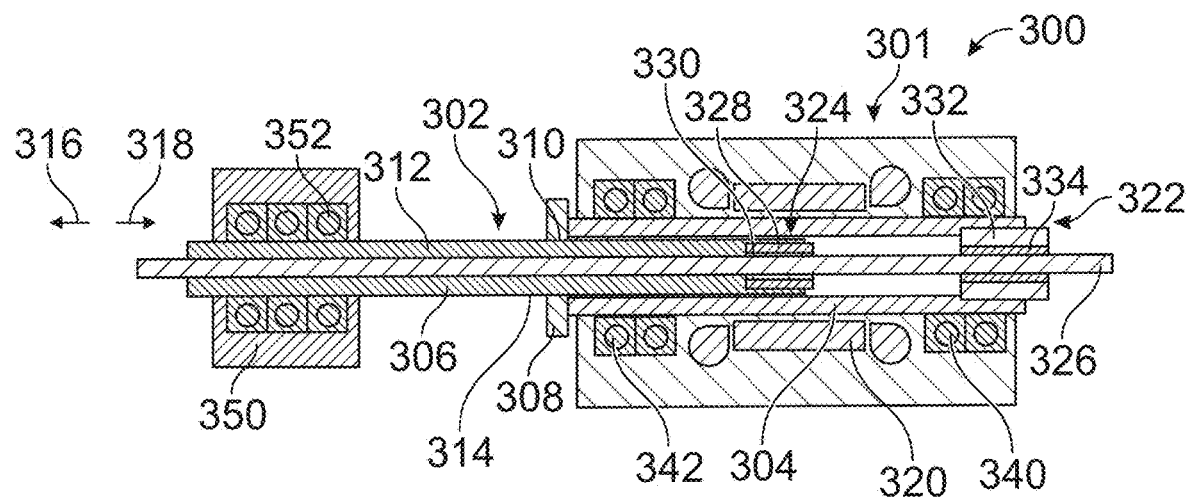
FIG. 14 is a schematic view of the first headstock of FIG. 6 showing a motor of the first headstock that directly turns the spindle shaft and indirectly turns the spline shaft by way of a spline adapter between the spindle shaft and the spline shaft.

Referring to FIG. 14, a head 300 is depicted that is similar in many respects to the first head 14 discussed above. The head 300 includes a spindle assembly 302 including a spindle shaft 304 and a spline shaft 306. The spindle assembly 302 includes a spline adapter 308 fixed to the spindle shaft 304 such as by fasteners. The spline adapter 308 has an opening 314 through which the spline shaft 306 extends. The spline adapter 308 has female splines 310 that engage male splines 312 of the spline shaft 306. The engagement between the female splines 310 and the male splines 312 permits the spline shaft 306 to shift axially relative to the spindle shaft 304 in an axially inward, retracting direction 316 and in an axially outward, extending direction 318. The engagement between the female splines 310 and male splines 312 inhibits relative rotary movement of the spline shaft 306 and the adapter 308. The head 300 has a drive 301 including a motor 320 connected to the spindle shaft 304 such as by having a rotor of the motor 320 shrink-fit onto the spindle shaft 304. The motor 320 turns the spindle shaft 304 which in turn, turns the spline shaft 306 via the spline adapter 308.

The head 300 includes a guide bushing 322 similar to the guide bushing 70 discussed above that is mounted to the spindle shaft 304 and rotates therewith. The guide bushing 70 cooperates with a collet assembly 324 to support a workpiece 326. The collet assembly 324 has a collet adapter 328 that engages an inner surface of the spline shaft 306 and a collet 330 that engages the workpiece 326. The guide bushing 322 similarly includes a guide bushing adapter 332 and a work holder such as a guide collet 334. The collet 324 is fixed relative to the workpiece 326 in axial and rotary directions whereas the guide collet 334 permits axial shifting of the workpiece 326 relative to the guide bushing 322. The head 300 includes bearings 340, 342 that support the spindle shaft 304 and a support assembly 350 that is axially shiftable in directions 316, 318 to shift the spline shaft 306 and workpiece 326 secured thereto in axial directions 316, 318. The support assembly 350 has bearings 352 to permit rotation of the spline shaft 306.

Figure 15:
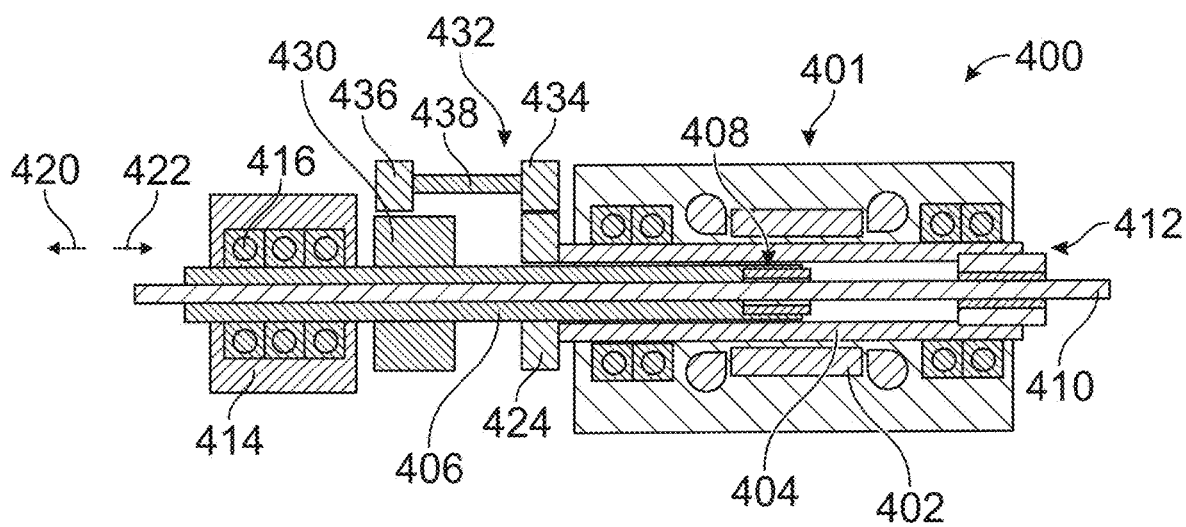
FIG. 15 is a schematic view of another headstock for a Swiss-type machine tool having a first gear connection between a spindle shaft and a sleeve of the headstock to transfer turning of the spindle shaft into turning of the sleeve.

Referring to FIG. 15, a head 400 is depicted that is similar in many respects to the head 300 discussed above such that differences will be highlighted. The head 400 has a drive 401 including a motor 402, a spindle shaft 404, and a sleeve 406 that is axially shiftable relative to the spindle shaft 404. The motor 402 is operable to rotate the spindle shaft 404.

The sleeve 406 has a collet assembly 408 that engages a workpiece 410 and the spindle shaft 404 has a removable guide bushing 412 similar to the guide bushing 70 discussed above. The head 400 has a support assembly 414 with bearings 416 to rotatably support the sleeve 406. The support assembly 414 is axially shiftable to shift the sleeve 406 in axial directions 420, 422.

To transfer rotation of the spindle shaft 404 into rotation of the sleeve 406, the head 400 includes a drive spindle gear 424 mounted to the spindle shaft 404 for rotation therewith. The head 400 further includes a driven sleeve gear 430 mounted to the sleeve 406 and a middle or intermediate transmission gear assembly 432 that connects the spindle gear 424 and the sleeve gear 430. In one embodiment, the middle gear assembly 432 includes a first gear 434, a second gear 436, and a rotary gear shaft 438 having the gears 434, 436 mounted thereto so as to be interconnected for rotating together.

The motor 402 rotates the spindle shaft 404, which rotates the spindle gear 424 mounted thereto. Rotation of the spindle gear 424 causes rotation of the first gear 434, shaft 438, second gear 436, sleeve gear 430, and sleeve 406. The sleeve gear 430 and second gear 436 are configured to permit the axial movement of the sleeve gear 430 with the sleeve 406 in directions 402, 422 while maintaining engagement between the teeth of the gears 430, 436.

Figure 16:
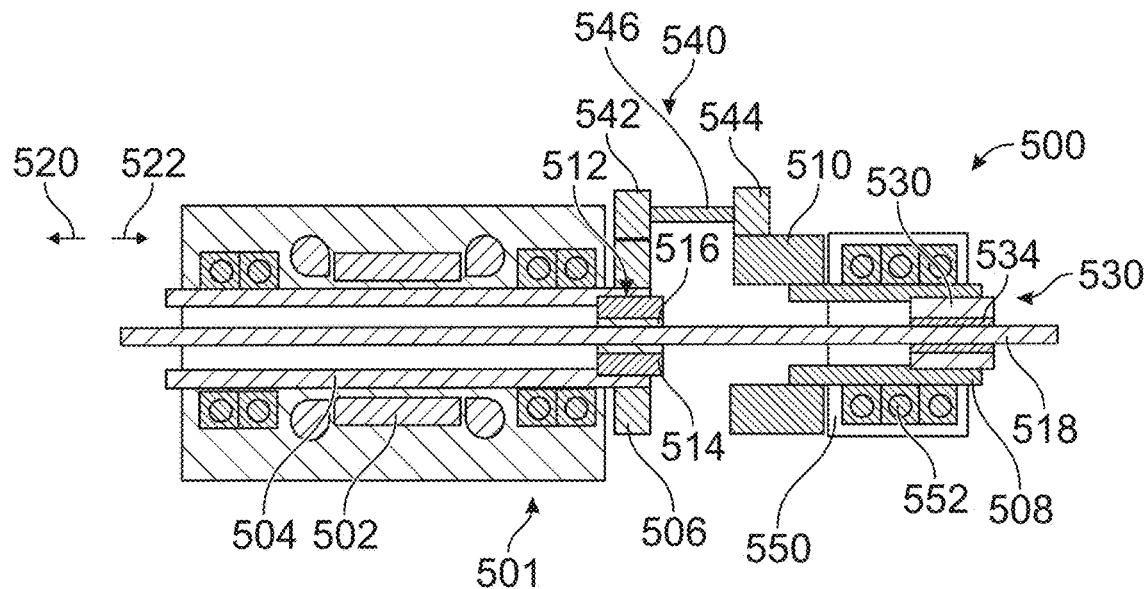
FIG. 16 is a schematic view of another headstock for a Swiss-type machine tool having a second gear connection between a spindle shaft and a sleeve of the headstock to transfer turning of the spindle shaft into turning of the sleeve.

Referring to FIG. 16, a head 500 is depicted that is similar to the head 400 discussed above such that differences will be highlighted. The head 500 has a drive 501 including a motor 502 that turns a spindle shaft 504 and a drive spindle gear 506 attached to the spindle shaft 504. The head 500 further includes a sleeve 508 having a driven sleeve gear 510 attached thereto. The spindle shaft 504 includes a collet assembly 512 having a collet adapter 514 and a collet 516. The collet 516 engages a workpiece 518 and fixes the workpiece 518 in the rotary and axial directions relative to the spindle shaft 504. The head 500 adjusts the axial position of the workpiece 518 by way of shifting the motor 502 and the spindle shaft 504 in axial directions 520, 522.

The head 500 includes the sleeve 508 with a guide bushing 530 similar to the guide bushing 70 discussed above. The guide bushing 530 includes a guide bushing adapter 532 and a guide collet 534. The guide bushing 530 permits the workpiece 518 to shift axially relative to the sleeve 508 while providing support for the workpiece.

To rotate the sleeve 508 with the spindle shaft 504, the head 500 includes a middle or intermediate transmission gear assembly 540 including a first gear 542 engaged with the spindle gear 506, a second gear 544 engaged with the sleeve gear 510, and a rotary gear shaft 546 connecting the first gear 542 and the second gear 544. In this manner, rotation of the spindle shaft 504 causes rotation of the spindle gear 506, the first gear 542, the shaft 546, the second gear 544, the sleeve gear 510, and the sleeve 508. The second gear 544 and the sleeve gear 510 are configured to permit axial movement of the second gear 544 relative to the sleeve gear 510 as the spindle shaft 504 is shifted in direction 520, 522. In FIG. 16, the support assembly 550 may be stationary and includes bearings 552 that permit rotation of the sleeve 508.

Figure 17:
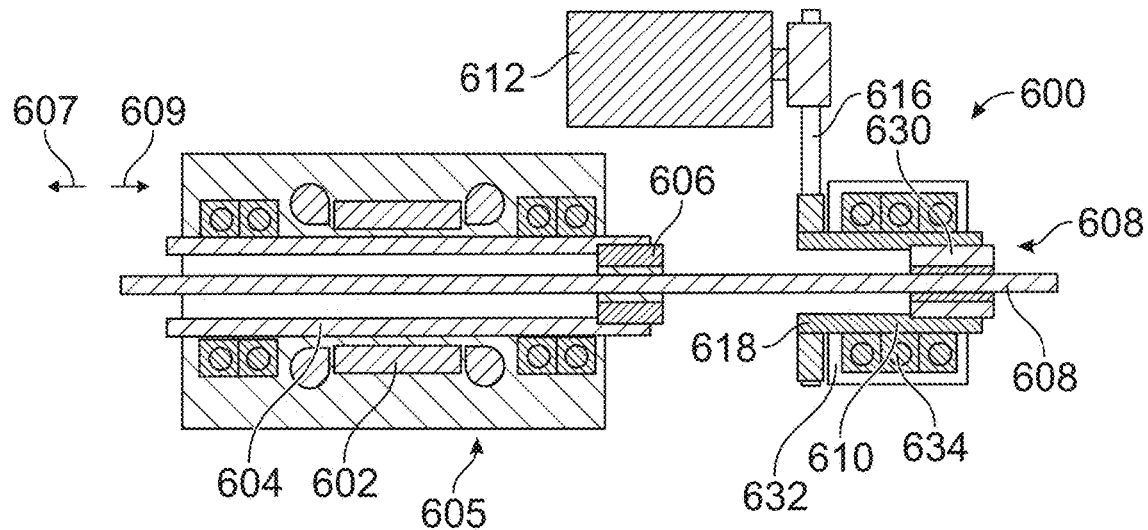
FIG. 17 is a schematic view of another headstock for a Swiss-type machine tool having a first motor to drive a spindle shaft of the headstock and a second motor to drive a sleeve of the headstock.

Referring to FIG. 17, a head 600 is depicted that is similar in many respects to the heads discussed above such that differences will be highlighted. The head 600 includes a spindle assembly 608 that includes a spindle shaft 604 and a sleeve 610. The head 600 has a drive 605 including a first motor 602 operable to rotate the spindle shaft 604 that includes a collet assembly 606. The collet assembly 606 fixes a workpiece 608 relative to the spindle shaft 604. The motor 602 and spindle shaft 604 are axially shiftable in axial directions 607, 609 to adjust the axial position of the workpiece 608.

The drive 605 of the head 600 includes a second motor 612 with a drive pulley 614 that drives a timing belt 616 engaged with a driven pulley 618. The pulley 618 is attached to the sleeve 610. Thus, the second motor 612 rotates the sleeve 610 while the first motor 602 rotates the spindle shaft 604. The first and second motors 602, 614 may be operated at the same or different speeds as required for a particular application.

The sleeve 610 supports a guide bushing 630 that is similar to the guide bushing 70 discussed above. The guide bushing 630 permits a workpiece 608 to shift axially relative to the sleeve 610. The head 600 has a support assembly 632 that remains stationary and includes bearings 634 that rotatably support the sleeve 610.

Figure 18:
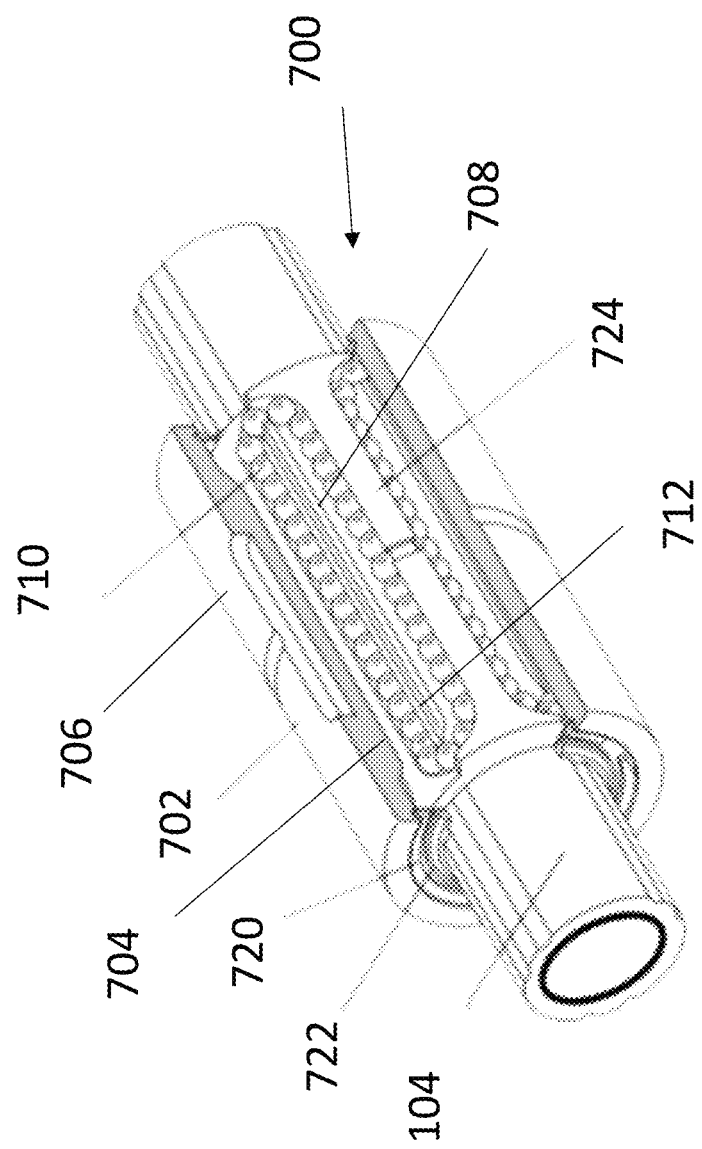
FIG. 18 is a perspective view of a ball spline connection with a portion of the connection removed to show a spline nut, ball bearings, and a spline shaft of the ball spline connection.

With reference to FIGS. 6 and 18, the slide connection 130 between the spindle shaft 102 and the spline shaft 104 may have a variety of configurations. In one embodiment, the slide connection 130 includes a ball spline connection 700 including the spline shaft 104 and a spline nut 702 of the spindle shaft 102. For example, the spline nut 702 may be mounted to a tubular member of the spindle shaft 102.

The spline nut 702 includes splines 704 extending radially inward from an outer wall portion 706 of the spline nut 702. The spline shaft 104 has splines 708 extending radially outward. The ball spline connection 700 has a plurality of roller elements such as ball bearings 710 received in pockets 712 formed between the spindle shaft 102 and the spline nut 702. The ball bearings 710 may roll within the pockets 712 to permit the spindle shaft 102 and the spline shaft 104 to shift axially relative to one another.

The spline nut 702 applies a compressive force radially inward against the ball bearings 710. In one approach, the spline nut 702 is heated to expand the spline nut 702, then permitted to cool once assembled with the spline shaft 104 and ball bearings 710. The inner diameter of the spline shaft 104 slightly constricts, such as by a few microns, which applies the compressive force against the ball bearings 710.

The tight engagement between the spline shaft 104, ball bearings 710, and spline nut 702 rigidly secures the spline shaft 104 and spline nut 702 against rotation relative to one another. The secure connection permits the ball spline connection 700 to transfer turning of the spindle shaft 102 to the spline shaft 104 without backlash. Despite being firmly engaged with the spline shaft 104 and the spline nut 702, the ball bearings 710 are able to roll along the surfaces of the pockets 712 to permit relative axial movement of the spline shaft 104 and spline nut 702. By eliminating backlash, the ball spline connection 700 allows for highly accurate rotary positions of the workpiece, secured to the spline shaft 104, to be determined.

In some embodiments, the ball spline connection 700 includes a snap ring 720, a seal 722, and a spacer such as a retainer 724. The retainer 724 limits contact between the ball bearings 710.

Figure 19:
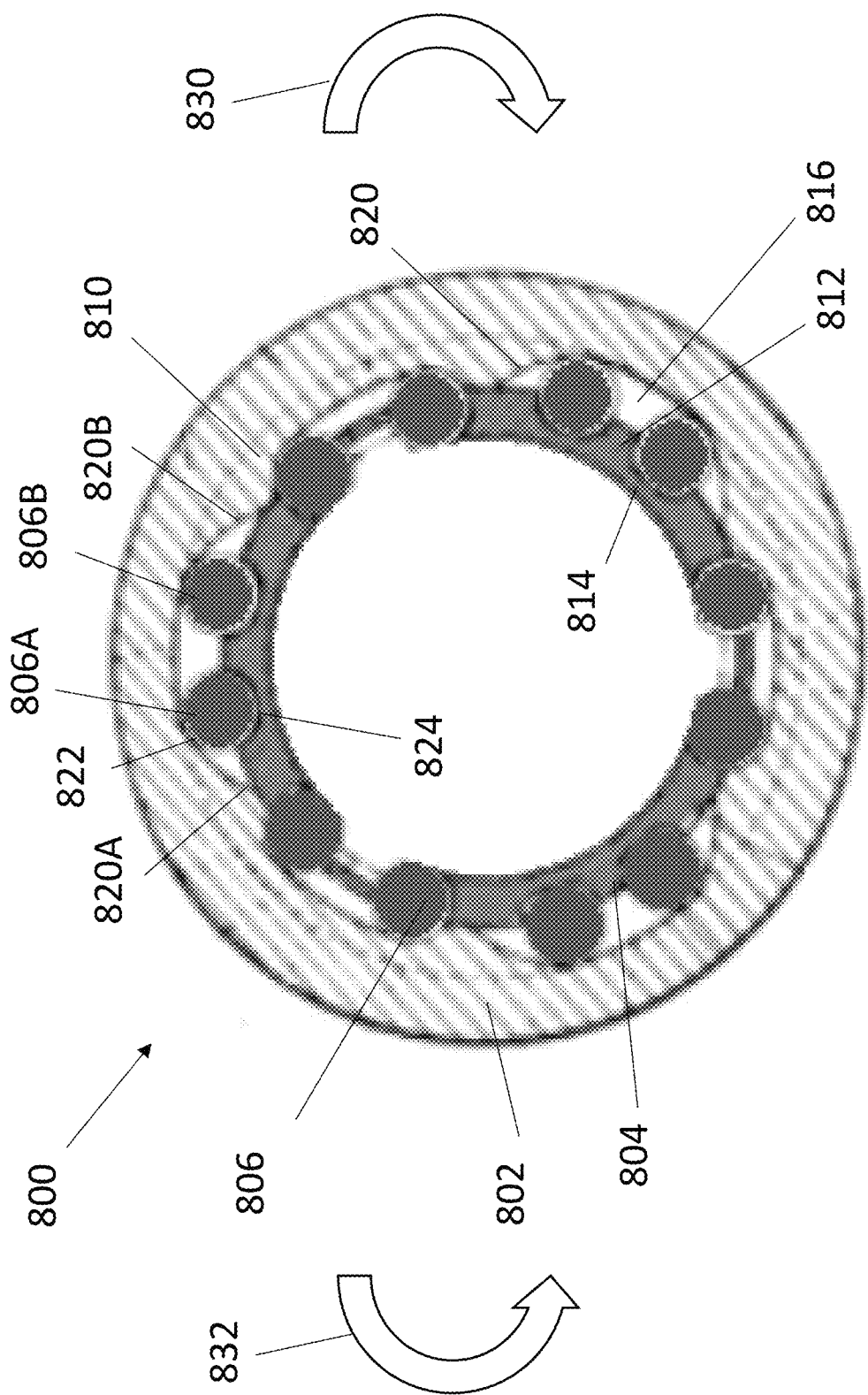
FIG. 19 is a cross-sectional view of a ball spline connection including a spline nut, a spline shaft, and ball bearings engaged with side surface portions of splines of the spline nut and the spline shaft.

Referring to FIG. 19, a cross-section of a ball spline connection 800 is illustrated that is similar in many respects to the ball spline connection 700 discussed above and may be utilized with the machine tool 10 or another machine tool disclosed herein. The ball spline connection 800 includes a spline nut 802, a spline shaft 804, and ball bearings 806. The spline nut 802 has splines 810 and the spline shaft 804 has splines 812 such as lands between recesses 814 of the spline shaft 804. The spline nut 802 and spline shaft 804 define pockets 816 in which the ball bearings 806 roll upon relative axial movement of the spline nut 802 and the spline shaft 804.

The splines 810 of the spline nut 802 have tapered side surface portions 820 such as side surface portions 820A, 820B and the splines 812 of the spline shaft 804 have surface portions 824. The ball bearings 806 have outer surfaces 822 that roll along the side surface portions 820A, 820B and surface portions 820 with relative axial movement of the spline shaft 804 and the spline nut 802.

Upon the spline nut 802 turning in direction 830, the tapered side surface portion 820A engages the outer surface 822 of ball bearing 806A. The tapered side surface portion 820A cammingly urges the ball bearing 806A radially inward into tighter engagement with the spline shaft 804. The ball bearing 806A rigidly resists the camming action and urges the spline shaft 804 to turn in direction 830 with the spline nut 802. Conversely, turning the spline nut 802 in direction 832 causes the tapered side surface 820B to engage the ball bearing 806B and cammingly urge the ball bearing 806B radially inwardly into tighter engagement with the spline shaft 804. The ball bearing 806B rigidly resists the camming action and urges the spine shaft 804 to turn in direction 832 with the spline nut 802.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A machine tool comprising:
a workpiece holding shaft;
a workpiece supporting shaft;
a tool holder associated with the workpiece supporting shaft for holding at least one tool;
a drive operable to rotate the workpiece holding shaft and the workpiece supporting shaft around an axis;
a work holder of the workpiece holding shaft configured to secure a workpiece to the workpiece holding shaft;
the workpiece holding shaft and the workpiece supporting shaft axially shiftable relative to one another to adjust a position of the workpiece relative to the workpiece supporting shaft;
a removable workpiece support configured to be releasably connected to the workpiece supporting shaft and rotate therewith, the workpiece support configured to slidably contact the workpiece and permit axial movement of the workpiece relative to the workpiece support; and
the workpiece holding shaft having an axially extended position relative to the workpiece supporting shaft that permits a probe to be connected to the workpiece holding shaft with the workpiece support removed from the workpiece supporting shaft.

2. The machine tool of claim 1 wherein the workpiece holding shaft has an axially retracted position relative to the workpiece supporting shaft wherein the workpiece holding shaft positions the probe to be contacted by the tool of the tool holder.

3. The machine tool of claim 1 in combination with the probe, wherein the workpiece supporting shaft includes a forward end;
wherein the probe includes an adapter portion configured to be connected to the workpiece holding shaft and a sensing portion; and
wherein the adapter portion of the probe is rearward of the forward end of the workpiece supporting shaft and the sensing portion is forward of the forward end of the workpiece supporting shaft with the probe connected to the workpiece holding shaft and the workpiece holding shaft in an axially retracted position relative to the workpiece supporting shaft.

4. The machine tool of claim 1 in combination with the probe;
wherein the workpiece supporting shaft includes a forward end and the workpiece holding shaft includes a forward end;
wherein the workpiece holding shaft forward end is rearward of the workpiece supporting shaft forward end with the workpiece holding shaft in an axially retracted position relative to the workpiece supporting shaft; and
wherein the probe includes a sensing portion forward of the workpiece supporting shaft forward end with the workpiece holding shaft in the axially retracted position.

5. The machine tool of claim 4 wherein the workpiece holding shaft forward end is closer to the workpiece supporting shaft forward end with the workpiece holding shaft in the extended position than in the retracted position to facilitate connecting of the probe to the workpiece holding shaft.

6. The machine tool of claim 1 in combination with the probe, wherein the workpiece supporting shaft has a forward end and the workpiece holding shaft is a first axial distance from the forward end of the workpiece supporting shaft with the workpiece holding shaft in an axially retracted position relative to the workpiece supporting shaft; and
wherein the probe includes a sensing portion and the probe has an axial length greater than the first axial distance so that the sensing portion of the probe is forward of the forward end of the workpiece supporting shaft with the workpiece holding shaft in the retracted position.

7. The machine tool of claim 1 wherein the workpiece supporting shaft has an opening; and
wherein the workpiece support includes an adapter portion sized to fit in the opening and a detent member having an unlocked position wherein the detent member permits the workpiece support adapter to be positioned in the opening of the workpiece supporting shaft opening and a locked position wherein the detent member secures the workpiece support to the workpiece supporting shaft.

8. The machine tool of claim 1 wherein the workpiece support includes a detent member having an unlocked position wherein the detent member permits the workpiece support to be connected to the workpiece holding shaft and a locked position wherein the detent member secures the workpiece support to the workpiece holding shaft; and
an actuator of the workpiece support operable to shift the detent member from the unlocked position to the locked position.

9. The machine tool of claim 8 wherein the workpiece supporting shaft and the workpiece support include a keyway and a key configured to resist turning of the workpiece support relative to the workpiece supporting shaft.

10. The machine tool of claim 1 wherein the support includes a guide bushing having a central opening that receives the workpiece.

11. The machine tool of claim 1 wherein the workpiece holding shaft and the workpiece supporting shaft include a spline connection therebetween configured to transfer rotation of one of the workpiece holding shaft and the workpiece supporting shaft to the other of the workpiece holding shaft and the workpiece supporting shaft.

12. The machine tool of claim 1 wherein the workpiece holding shaft includes a first gear and the workpiece supporting shaft includes a second gear; and
a middle gear assembly engaged with the first and second gears to transfer rotation of one of the workpiece holding shaft and the workpiece supporting shaft to the other of the workpiece holding shaft and the workpiece supporting shaft.

13. The machine tool of claim 1 wherein the drive includes a first motor operable to rotate the workpiece holding shaft and a second motor operable to rotate the workpiece supporting shaft.

* * * * *